July 12, 1949.  H. T. FEARNEHOUGH  2,475,780
TRAILER HITCH
Filed April 21, 1947
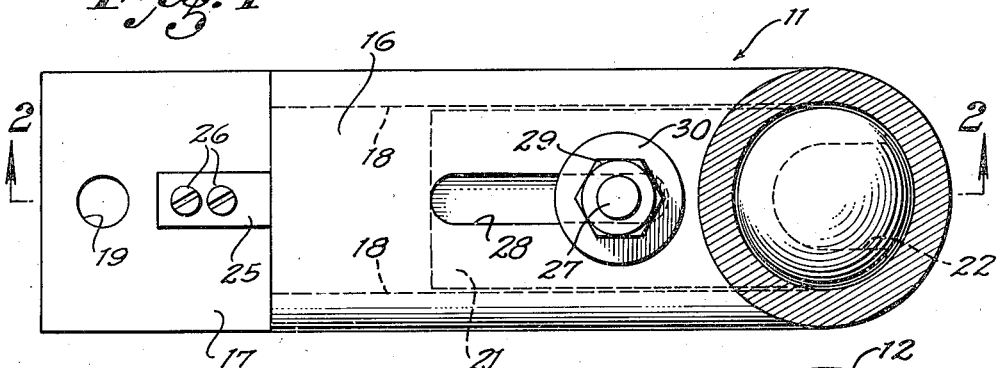
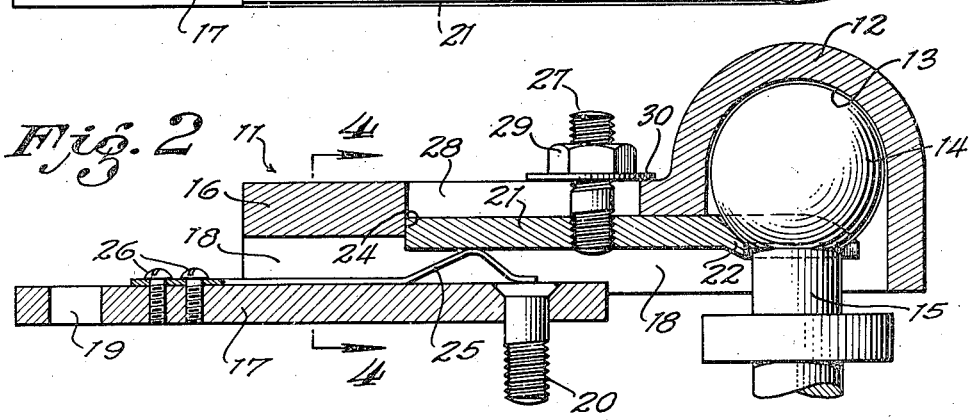
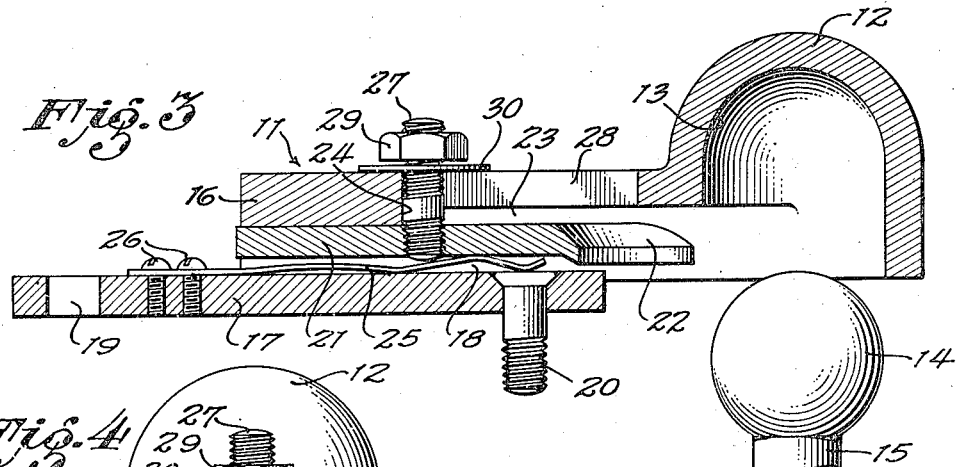
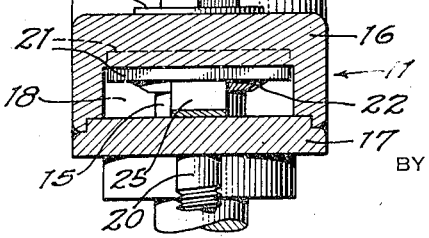
INVENTOR,
HARRY T. FEARNEHOUGH
BY John H. Rouse,
ATTORNEY Patented July 12, 1949

2,475,780

UNITED STATES PATENT OFFICE 2,475,780

TRAILER HITCH

Harry T. Fearnehough, Los Angeles, Calif.

Application April 21, 1947, Serial No. 742,944

3 Claims. (Cl. 280—33.17)

This invention relates to hitches of the ball-and-socket type commonly employed for connecting a trailer to an automobile; a general object of the invention being to provide a trailer hitch which, while readily and easily coupled and uncoupled, is safe from accidental uncoupling.

Various means have been proposed for ensuring against accidental uncoupling of trailer hitches, such as, for example, bolt-and-nut arrangements for securing the locking parts together and including special means for preventing loosening of the nut. Such means have not proved entirely satisfactory due mainly to the wear resulting from the severe vibration to which the hitch is subjected in use. It is therefore another object of this invention to provide a trailer hitch which, while employing a bolt-and-nut arrangement for rigid securement of its locking member, also includes means whereby the locking member is maintained in locking position if the nut becomes loosened or is even entirely removed.

More specifically, the invention comprehends an arrangement wherein a locking member or yoke is reciprocable in one plane into and out of locking position, the yoke being normally retained by a spring in another plane wherein its retraction from locking position is positively prevented.

For full understanding of the invention, and further appreciation of its features and advantages, reference is to be had to the following detailed description and accompanying drawing, and to the appended claims.

In the drawing:

Figure 1 is a plan of a trailer hitch embodying this invention, the socket-forming portion of the device being shown in section;

Figure 2 is a longitudinal section taken along the lie 2—2 of Fig. 1;

Figure 3 is a view similar to that of Fig. 2 but showing the parts in moved positions; and Figure 4 is a transverse section taken along the line 4—4 of Fig. 2.

Generally indicated in the drawing by the numeral 11 is an elongated member having at one end a domed portion 12 which is formed internally to provide a semispherical socket 13 for receiving a ball 14 having a shank 15 whose lower portion (not shown) may be threaded for attachment in the usual manner to the rear bumper or other suitable part of an automobile. The member 11 is conveniently formed by a channeled upper section 16 which, as seen in Fig. 4, is step-joined and welded to a plate 17 so as to provide an opening 18, rectangular in cross-section, which extends rearwardly from the socket 13 the full length of the upper section 16. For attaching the member 11 to a trailer, the plate 17 is provided with a bolt-hole 19 and a threaded stud 20 welded to the plate.

Within the opening 18 is a locking member or yoke 21 whose front portion 22 is forked (as seen in broken lines in Fig. 1) so that it can straddle the ball-shank 15, and is shaped (as seen in Fig. 3) to conform to the curvature of the ball.

At its end adjoining the socket, the opening 18 is enlarged to provide an upper recess 23 (Fig. 3) for receiving the yoke 21 when the same is in ball-retaining position; the left-hand or rear wall of the recess forming an abutment 24 which is so located that the forked front portion 22 of the yoke is maintained in engagement with the lower surface of the ball when the yoke is in the recess, as shown in Fig. 2. The yoke is normally held in the recess by the force of a bent leaf-spring 25 disposed in the opening 18 below the yoke and secured to the plate 17 by screws 26.

For rigid securement of the yoke in the recess, the yoke is provided with a stud-bolt 27 which extends upwardly through a longitudinal slot 28 in the member 11 and is provided with a nut 29 and washer 30; the stud-bolt being tightly secured in the yoke so that it cannot be loosened by rotation of the nut.

As shown in Fig. 2 the trailer hitch is securely locked in coupled position. To uncouple the hitch, the nut 29 is loosened and backed-off several turns so that by manual pressure on the stud-bolt the yoke can be shifted downwardly out of the recess 23 against the force of spring 25, and then slid back in the smaller part of the opening 18 into the position shown in Fig. 3; the ball then being free for removal from the socket.

To couple the hitch, the yoke is slid forward and when it reaches its final or ball-retaining position the spring snaps the yoke up into the recess. Obviously, if manual pressure is maintained on the stud-bolt, the yoke may be slid backward and forward while it is in its lower plane.

It will be observed that the stud-bolt and nut serve merely to prevent rocking movement of the yoke (and attendant wear) while the vehicles are in motion, since retraction of the yoke to ball-releasing position is prevented by the abutment 24 formed by the end wall of the recess wherein the yoke is retained by spring 25. It follows that if the nut 29 is accidentally loosened there is no danger of the hitch becoming uncoupled. Even in the event of breakage of the spring, the normal downward pull of the ball tends to so rock the yoke that it remains in engagement with the abutment; however, it is obvious that two independent springs may be provided if deemed expedient.

The specific embodiment of my invention herein shown and described is obviously susceptible of modification without departing from the spirit of the invention, and I intend therefore to be limited only by the scope of the appended claims.

I claim as my invention:

1. In a trailer hitch of the ball-and-socket type: an elongated member having at one end a downwardly-facing socket for freely receiving said ball; a yoke for retaining the ball in said socket and having an end portion formed to cooperate with a lower surface of the ball; said member being formed to provide, intermediate its top and bottom surfaces, a longitudinal horizontal opening communicating with said socket and wherein said yoke is reciprocable into and out of ball-retaining position; said opening being enlarged at its end adjacent the socket to provide an upper recess for so receiving the yoke, when the same is moved to ball-retaining position, that retraction of the yoke is then prevented; a spring in said opening and acting upwardly on the yoke for yieldably retaining the yoke in said recess; and additional means for retaining the yoke in said recess, comprising a bolt secured to the yoke and extending upwardly through a slot in said member.

2. In a trailer hitch of the ball-and-socket type: a member having a socket for freely receiving said ball; a yoke for retaining the ball in said socket and reciprocable, in a horizontal plane, between positions away from and adjacent to the ball; said yoke, when in said position adjacent to the ball, being shiftable, while maintaining a horizontal position, to another plane into ball-retaining position; means on said member forming an abutment, engageable by the yoke when the same is in said other plane, for preventing movement of the yoke from said ball-retaining position; and a spring for temporarily retaining the yoke in said other plane; the arrangement being such that tilting of the yoke, due to force on the ball in a direction to withdraw the same from the socket, is ineffective to cause such disengagement of the yoke from said abutment as would permit release of the ball.

3. In a trailer hitch of the ball-and-socket type: an elongated member having at one end a downwardly-facing socket for freely receiving said ball; a yoke for retaining the ball in said socket and having an end portion formed to cooperate with a lower surface of the ball; said yoke being reciprocable, in one horizontal plane, between positions away from and adjacent to the ball; said yoke, when in said position adjacent to the ball, being shiftable, while maintaining a horizontal position, upwardly to another plane into ball-retaining position; means on said member forming an abutment, engageable by the end of the yoke opposite said end portion when the yoke is in said other plane, for preventing movement of the yoke from said ball-retaining position; and spring means, effective when the yoke is in ball-retaining position, for retaining the yoke in said other plane.

HARRY T. FEARNEHOUGH.

REFERENCES CITED

The following references are of record in the file of this patent:

UNITED STATES PATENTS

| Number | Name | Date |
|---|---|---|
| 2,088,991 | Berchtold | Aug. 3, 1937 |
| 2,104,576 | Zagelmeyer | Jan. 4, 1938 |
| 2,219,955 | Gilmore | Oct. 29, 1940 |
| 2,231,025 | Polstra | Feb. 11, 1941 |
| 2,326,466 | Kitterman | Aug. 10, 1943 |